I. E. COFFEY.
TRANSMISSION CONTROLLING MECHANISM.
APPLICATION FILED APR. 1, 1912, RENEWED JULY 17, 1920.
1,402,839.
Patented Jan. 10, 1922.
4 SHEETS—SHEET 1.
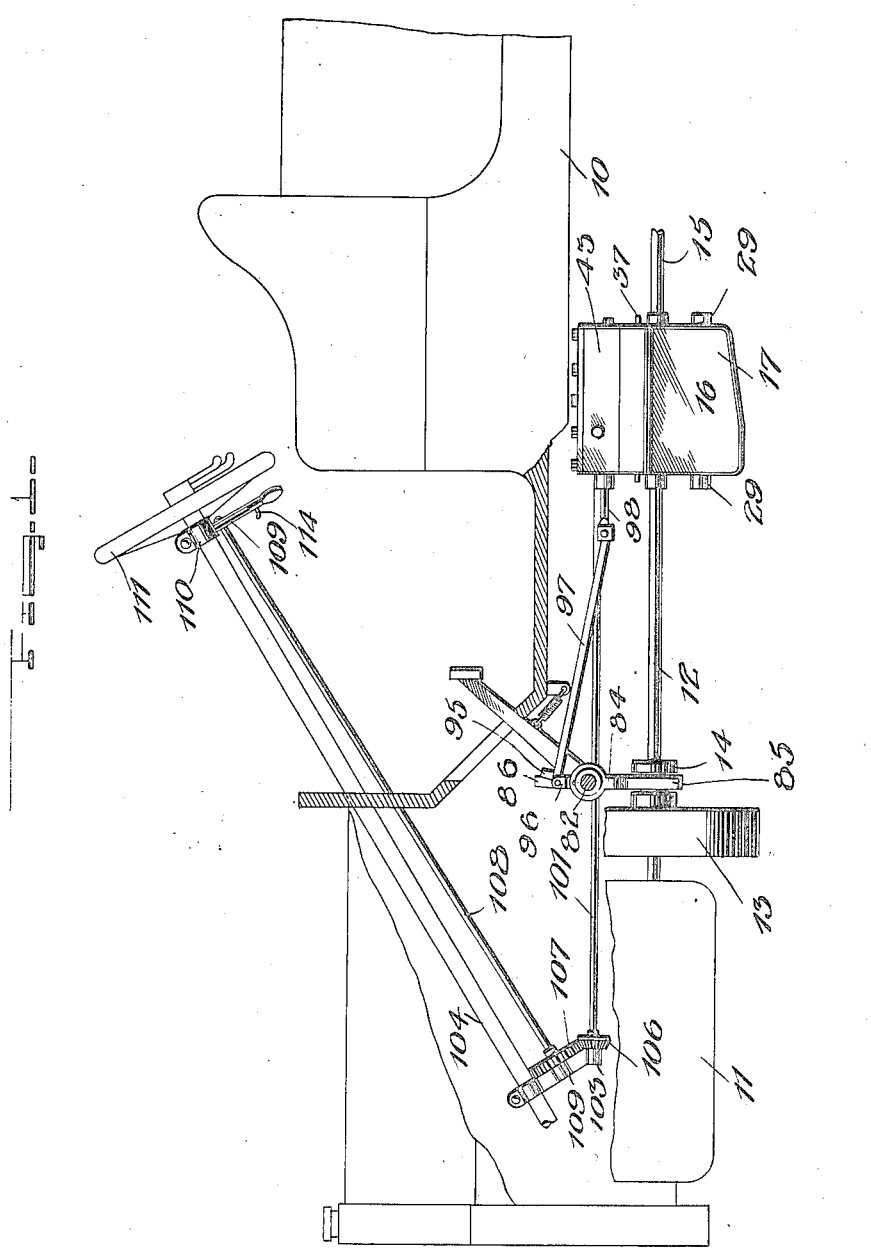

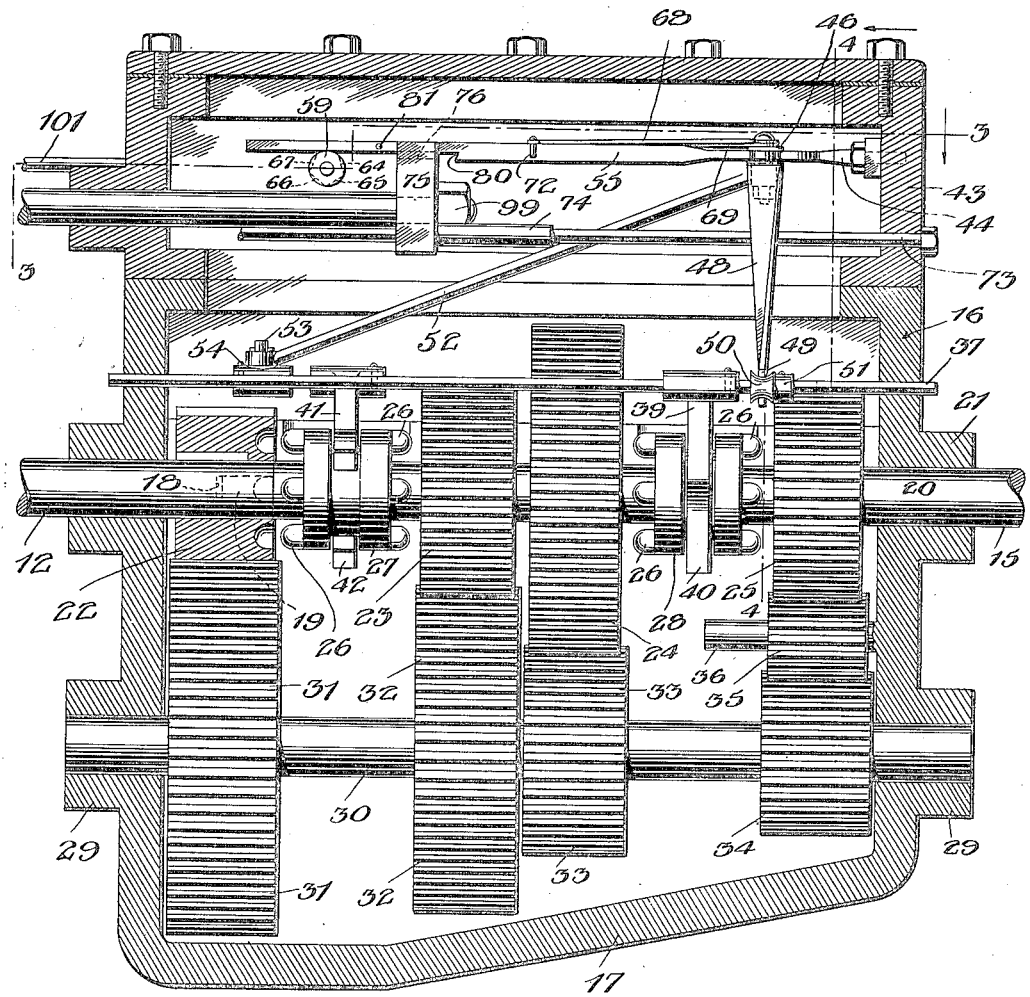

I. E. COFFEY.
TRANSMISSION CONTROLLING MECHANISM.
APPLICATION FILED APR. 1, 1912, RENEWED JULY 17, 1920.
1,402,839. Patented Jan. 10, 1922.
4 SHEETS—SHEET 3.
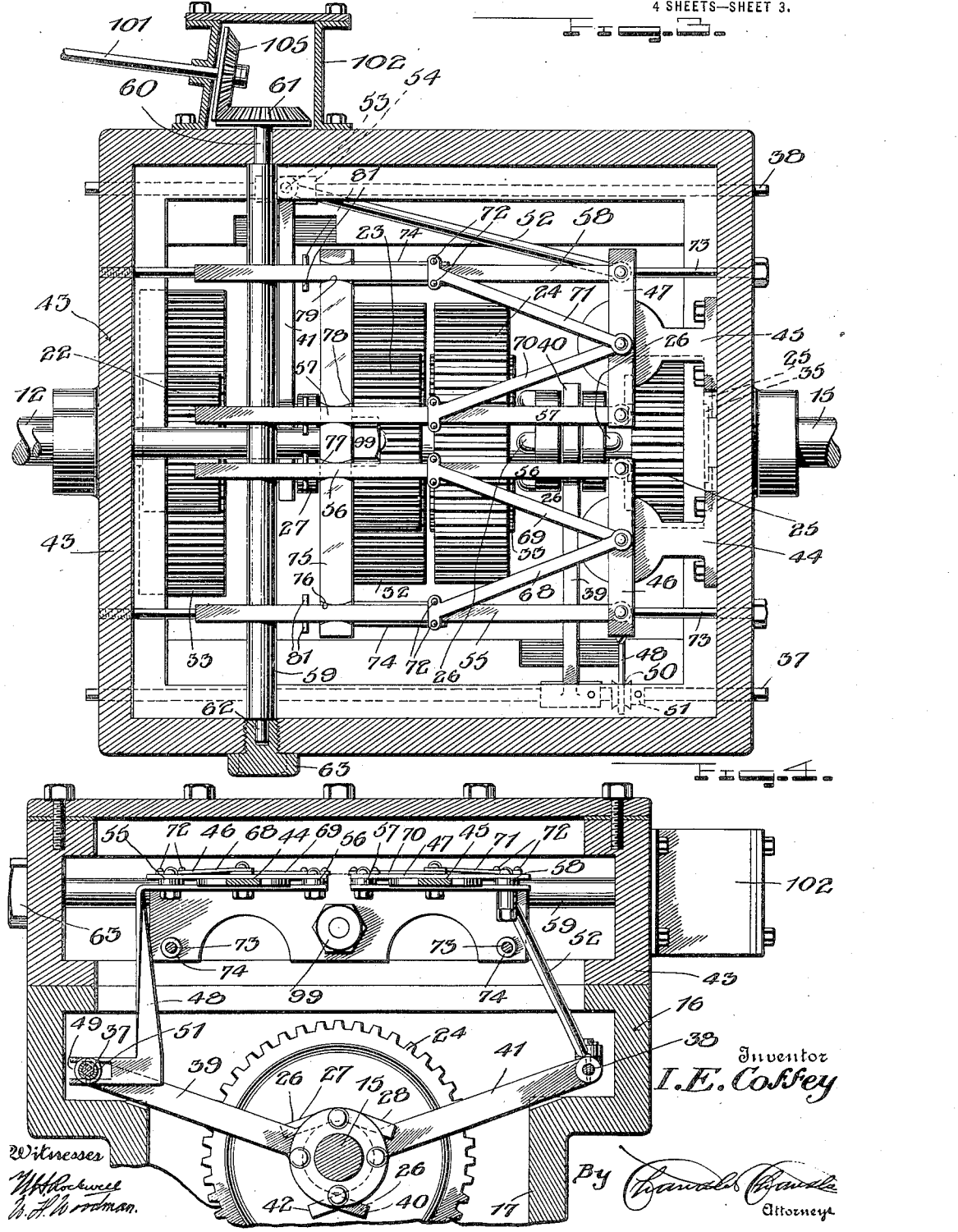
Inventor
I. E. Coffey

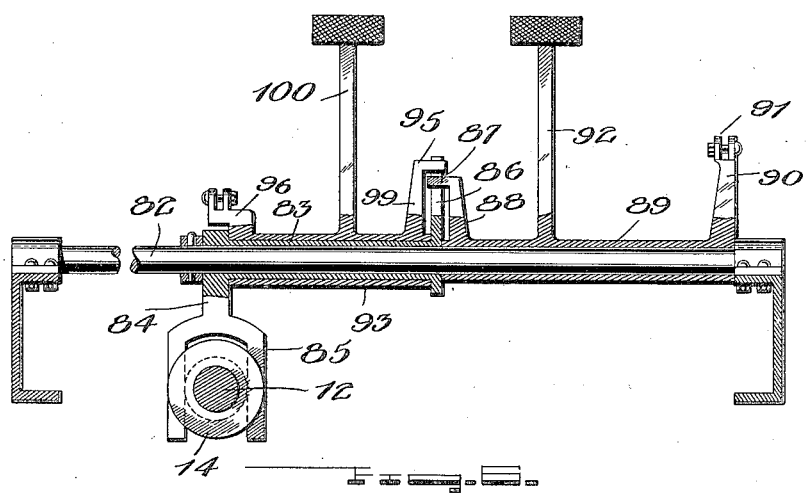
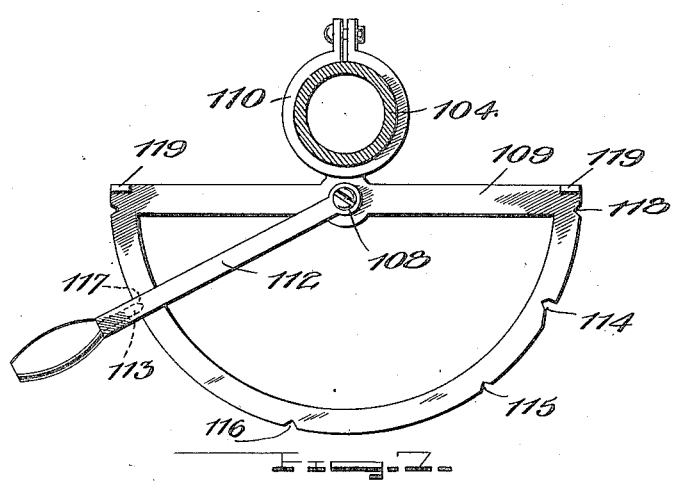
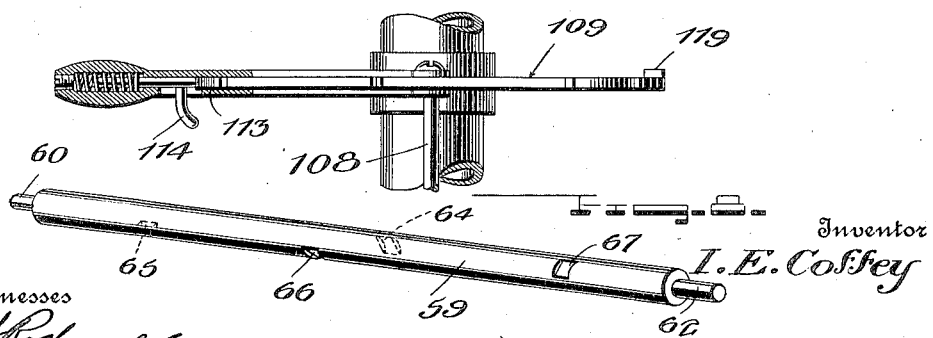

UNITED STATES PATENT OFFICE.

IRVEN E. COFFEY, OF LAWTON, OKLAHOMA.

TRANSMISSION-CONTROLLING MECHANISM. REISSUED 1,402,839.  Specification of Letters Patent.  Patented Jan. 10, 1922.

Application filed April 1, 1912, Serial No. 687,633. Renewed July 17, 1920. Serial No. 397,152.

*To all whom it may concern:*

Be it known that I, IRVEN E. COFFEY, a citizen of the United States, residing at Lawton, in the county of Comanche, State of Oklahoma, have invented certain new and useful Improvements in Transmission-Controlling Mechanisms; and I do hereby declare the following to be a full, clear, and exact description of the invention, such as will enable others skilled in the art to which it appertains to make and use the same.

My invention relates to new and useful improvements in power transmission mechanism for motor vehicles and means for controlling the same and the object of my invention is to improve the construction and increase the efficiency of the controlling mechanism for transmission gearing.

A further object of my invention is to provide means for changing the gears without the use of the ordinary change gear lever and H gate.

A further object of my invention is to provide a controlling mechanism which eliminates all possibility of changing the gearing without first releasing the clutch.

And a still further object of my invention is to provide a controlling mechanism in which the gearings must be locked in operative relation to each other before the clutch is thrown in.

With these and other objects in view, my invention will be more fully described, illustrated in the accompanying drawings which show a preferred embodiment of my device and then specifically pointed out in the claims which are attached to and form a part of this specification.

In the drawings,

Figure 1 is a fragmentary elevation of a motor car with my transmission mechanism applied thereto, parts being broken away to better show my invention.

Figure 2 is a central longitudinal section through the casings enclosing the control mechanism proper and the transmission gearing.

Figure 3 is a section on the line 3—3 of Figure 2.

Figure 4 is a fragmentary section on the line 4—4 of Figure 2.

Figure 5 is a longitudinal sectional view showing the mechanism of the clutch and brake and the manner in which they operate in connection with the control mechanism.

Figure 6 is a top plan of the quadrant and quadrant lever by means of which the selection of the gearing is accomplished.

Figure 7 is a front elevation of the quadrant, the lever handle being shown in section to bring out the construction of its locking pawl.

Figure 8 is a perspective of the tumbling shaft which is turned by the quadrant lever to select the desired gear.

Referring more specifically to the drawings, in which similar reference numerals designate corresponding parts throughout, 10 designates a conventional form of motor vehicle having an engine 11, crank shaft 12 provided with the usual fly wheel 13 and clutch 14, 15 the drive shaft and 16 designates as a whole the casing of my differential and control mechanism which, as shown, is positioned at the juncture of the crank shaft 12 and drive shaft 15.

Referring more specifically to the transmission mechanism, 17 designates the casing of the transmission mechanism proper and journaled in the front wall of this casing is the free end of the crank shaft 12 which is preferably provided with a socket 18 shaped to receive the reduced terminal 19 of the drive shaft 15 which shaft is journaled in the back wall of the casing in a bearing 21. Keyed upon that portion of the crank shaft 12 within the casing is a spur gear 22 while mounted for rotation upon the drive shaft 15 are spur gears 23, 24 and 25, the opposing faces of the gears 22 and 23 and of the gears 24 and 25 being recessed for the reception of the clutch fingers 26 of clutches 27 and 28 which are slidably keyed upon the drive shaft.

Journaled in aligned bearings 29 formed in the casing 17 is a jack shaft 30 which extends in parallel spaced relation to the drive shaft and upon which are keyed spur gears 31, 32, 33 and 34, the gears 31, 32 and 33 meshing with the gears 22, 23 and 24, while the gear 34 meshes with a gear 35 carried by a stub shaft 36, said latter gear in turn meshing with the gear 25 of the drive shaft.

Slidably mounted in suitable bores formed in the front and back walls of the casing 17 are clutch operating rods 37 and 38 the former of which is provided with an arm 39 terminating in a fork 40 engaging the clutch 28, while the rod 38 is provided with a similar arm 41 having a fork 42 which engages the clutch 27.

As will be seen by referring to the drawings if the rod 37 is moved forwardly the clutch 28 will be moved into engagement with the gear 24 locking the same upon the drive shaft, when the vehicle will be driven through the gears 22, 31, 33 and 24 forming the low gearing of the transmission mechanism. If the clutch 28 is then released and the rod 38 moved rearwardly to bring the clutch 27 into engagement with the gear 23 the drive will be through the gears 22, 31, 32 and 23 forming the intermediate gearing of the transmission mechanism. If then the clutch 27 is moved out of engagement with the gear 23 and the rod 38 moved to bring the clutch 27 into engagement with the gear 22, the shafts 12 and 15 will be locked together and the drive will be direct from the crank shaft or on the high gearing of the transmission mechanism. If the rod 37 is moved rearwardly to bring the clutch 28 into engagement with the gear 25 the drive will be through the gears 22, 31, 34, 35 and 25 which is the reverse drive.

My present invention relates primarily to the mechanism by means of which the clutch operating rods 37 and 38 are reciprocated and the description of the mechanism above given has been introduced merely to render more clear the operation of my device.

As shown in the drawings the top of the transmission casing 17 is open and secured upon the top of this casing is a casing 43 which incloses the controlling mechanism proper. Secured to the upper portion of the inner face of the rear wall of this casing is a pair of spaced brackets 44 and 45 and centrally pivoted upon these brackets are cross bars 46 and 47. Each of these cross bars is free to swing upon its pivotal point and they are connected to the rods 37 and 38 respectively in such a manner that such swinging will be communicated to the rods to reciprocate the same. I have illustrated in the drawings two separate and distinct means for connecting these bars to their respective rods, one means being shown in the connection between the bar 46 and the rod 37 while the other means is shown in the connection between the bar 47 and the rod 38. Bolted or otherwise secured to the cross bar 46 by one arm is a Z-shaped lever 48 the free arm of which is bifurcated to form a fork 49 which engages in the groove 50 of a block 51 carried by the rod 37. Pivotally secured by one end to one end of the cross bar 47 is a link 52 the other end of which is pivoted upon a trunnion 53 formed upon a block 54 carried by the rod 38. As will be seen the turning of the cross bar 46 will act, through the lever 48, to reciprocate the rod 37 while the turning of the cross bar 47 will act, through the link 52 to reciprocate the rod 38, the direction of movement of the rod in either case depending upon the direction in which the cross bar is swung.

Pivotally secured by their ends to the ends of the cross bar 46 are push bars 55 and 56 while pivotably secured by their ends to the ends of the cross bar 47 are push rods 57 and 58, these rods all extending longitudinally of the casing and in parallel relation to each other, being supported adjacent their free ends by a transversely extending shaft 59. One end of this shaft 59 is reduced as at 60 to pass through a suitable bearing formed in the casing and is provided upon its outer end with a bevel gear 61 by means of which the shaft may be revolved as will be hereinafter explained. The other end of the shaft is reduced to form a trunnion 62 which is journaled in a socket formed in the end of a bolt 63 which is threaded into a tapped bore formed in the opposite side of the casing.

The portions of the shaft 59 beneath the push rods 55, 56, 57 and 58 are notched as at 64, 65, 66 and 67. As will be seen when one of these notches is directed upward the corresponding push rod will tilt down to seat in the notch and will therefore be supported at a lower level than the remaining push rods. These notches are formed in the shaft in staggered relation and in such a manner that in one position of the shaft all of the push rods will be supported in raised position and in such a manner that but one push rod at a time can be lowered. In order to insure the proper seating of the push rods in the notches of the tumbling shaft 59 I have provided leaf springs 68, 69, 70 and 71 which as shown bear upon the push rods intermediate their length and exert a constant downward pressure upon the same, the springs 68 and 69 being secured to the pivotal point of the cross bar 46 by one end and having their opposite ends bearing upon the push rods 55 and 56 while the springs 70 and 71 are each secured by one end to the pivotal point of the cross bar 47 and have their free ends bearing upon the push rods 57 and 58. As shown the free ends of these springs are enlarged and provided with downwardly extending spaced pins 72 which bear one upon each side of the push rods and so prevent disengagement of the springs.

Extending longitudinally of the casing is a pair of parallel, spaced guide rods 73 which are passed through sleeves 74 carried by the ends of a cross head 75 which is thus mounted for reciprocation longitudinally of the casing. The upper face of this cross head is provided with transversely extending grooves 76, 77, 78 and 79 in which the push rods 55, 56, 57 and 58 rest and which serve to maintain said rods in proper spaced position so that they will seat in their respective notches of the tumbling shaft.

Each of the push rods is formed with a shoulder 80 extending downwardly from its lower face which is slidable through the groove of the cross head when the push rod is in normal position but which will engage with the cross head when the push rod is seated in its notch in the tumbling shaft 59, these shoulders being formed at a point between the cross head and the pivoted ends of the push rods. Each push rod is also provided upon the other side of the cross head with a transversely extending pin 81 the ends of which extend upon each side of the push rod in position to engage against the cross head when the latter is drawn toward the front end of the casing.

Having thus described the controlling mechanism proper I will now describe the means by which said mechanism is operated by the driver. Extending transversely of the vehicle and journaled in suitable bearings carried by the frame is a shaft 82 which carries a sleeve 83 provided at one end with a downwardly extending, integrally formed arm 84 terminating in a fork 85 which engages the clutch 14 of the crank shaft. The other end of this sleeve is provided with an upwardly directed, integrally formed arm 86 which is engaged by the lateral extension 87 of an upwardly directed arm 88 formed integrally with one end of a second sleeve 89 which is also carried by the shaft 82 and the other end of which is provided with an upwardly directed arm 90 to which is pivotally connected one end of the brake rod 91. This sleeve 89 is provided intermediate its length with an integrally formed foot pedal 92 by means of which the sleeve may be turned to apply the brake and to simultaneously release the clutch 14. Rotatably mounted about the sleeve 83 is a sleeve 93 one end of which is provided with an upwardly directed arm 94 having a lateral extension 95 which also engages with the arm 86 of the sleeve 83. The other end of this sleeve is provided with an integrally formed arm 96 to which is pivoted one end of a connecting rod 97 the other end of which is pivoted to the outer end of a rod 98 which is slidably mounted in a bearing formed in the front wall of the casing 43 and the other end of which is rigidly secured to the central portion of the cross head by a bolt 99. The sleeve 93 is provided intermediate its length with an upwardly directed, integrally formed foot pedal 100 by means of which it may be rotated to simultaneously release the clutch 14 and to draw the cross head 75 toward the tumbling shaft 59.

As a means for rotating the tumbling shaft 59 I have provided a shaft 101 one end of which is journaled in a suitable housing 102 formed about the bevel gear 61 while the other end is journaled in a bearing 103 carried by the casing 104 of the steering column. That end of the shaft journaled in the housing 102 is provided with a bevel gear 105 which meshes with the bevel gear 61 of the tumbling shaft while the other end of the shaft 101 is provided with a gear 106 which meshes with a gear 107 carried by the lower end of a shaft 108 which end, is journaled in a bearing 109 also carried by the casing 104 of the steering column. The free end of the shaft 108 extends through a suitable bore formed at the center part of a quadrant 109 which is secured in place by a clamping ring 110 which engages about the steering column immediately below the steering wheel 111. Secured to the upper end of this shaft 108 is a lever 112 which swings over the quadrant and which is provided with a spring pressed pawl 113 having a trigger 120, said pawl being adapted to engage in any one of a plurality of notches 114, 115, 116, 117 and 118 formed at spaced intervals about the peripheral edge of the quadrant. As shown these notches with the exception of the notch 114 are so formed that the lever may be moved from one to the other without manually disengaging the pawl by means of its trigger. The notch 114 however is so formed that the pawl must be manually released before the lever can be swung to the notch 118. The quadrant is provided at each end with an upwardly directed lug 119 which serves to prevent excessive movement of the lever.

In operation suppose the gearing to be in neutral position with the quadrant lever 112 at the notch 114, with the engine running, and with the clutch 14 thrown in. In this position the push rods are all supported by the tumbling shaft 59 in their raised position and both of the transmission clutches 27 and 28 are in inoperative position, no power therefore being transferred to the drive shaft. The lever 112 is then swung to the notch 115 which indicates low speed and which actuates the tumbling shaft 59 to bring its notch 66 uppermost. The pedal 100 is then actuated which releases the clutch 14 and simultaneously draws the cross head 75 forward beyond the shoulders 80 of the push rods allowing the push rod 56 to drop into the notch 64 of the tumbling shaft. The pedal 100 is then released, throwing the clutch 14 and moving the cross head 75 toward the rear end of the casing. As the cross head moves it engages against the shoulder 80 of the push rod 56 forcing said rod toward the rear of the casing and rotating the cross bar 46 to throw the transmission clutch 28 into engagement with the gear 24 to give a low speed drive.

When sufficient head way has been obtained the gear is thrown into intermediate speed by moving the lever 112 to the notch 116 to raise the push rod 56 and to lower the push rod 58. The pedal 100 is again actuated, throwing out the clutch 14, and drawing the cross head forward, the cross head during this forward movement engaging the pin 81 of the push rod 56 to draw said rod back to normal position and thus throw the transmission clutch 28 into inoperative position. The clutch pedal 100 is then released to throw in the clutch 14 and to move the cross head toward the rear of the casing during which movement, it engages with the shoulder of the push rod 58 which in the mean time has fallen into the notch 65 of the tumbling shaft, forcing the same rearwardly and turning the cross bar 47 to throw the transmission clutch 27 into engagement with the gear 23, thus giving intermediate speed.

When desired, the high gear can be thrown in by moving the lever 112 to the notch 117 and again operating the clutch pedal.

If when the gears were in neutral position a reverse drive had been desired, the lever 112 would be swung to the notch 118 and the clutch pedal actuated.

As will be readily seen both the brake pedal 92 and the clutch pedal 100 throw the clutch 14 into inoperative position but the operation of the brake pedal in no way affects the gearing of the transmission mechanism.

It is to be noted that when the clutch pedal is actuated to throw in the main clutch, the cross head will be actuated and through the mechanism hereinbefore described will place a selected set of the transmission gearing in position for operation. When the clutch pedal, however, is operated to throw out the main clutch it will move the cross head in the opposite direction and return such selected set of transmission gearing and the connections therefor to neutral position, and this returning of such parts to neutral position is accomplished irrespective of the position of the selector mechanism at such times, that is to say the selector mechanism may be in selective position for any other of the sets of transmission gearing at the time a selected set is going to neutral position without interfering with or preventing the return of such selected set to such neutral position.

Further it will be noted that when the cross head 75 is drawn toward the front of the casing it will, by contact with the pins 81 move to neutral position any of the push rods which may happen to be out of such neutral position.

Another advantageous feature incident to my invention is that a certain set of gearing may be selected while the machine is running and another set of gearing is in position, this selection taking place prior to changing from one set to the other set of gearing and without affecting the gearing in use. For instance, if the machine be traveling on a level road with the high gearing in use, and is approaching a hill or rough stretch of road where it is desired to use the low gearing, the quadrant lever may be moved to the low position at once to select such low gearing, but the latter, of course, will not be thrown into operation until the foot pedal is actuated. When the hill is reached it is only necessary for the operator to actuate the foot pedal as before described, to make the change from high gearing to low gearing. If, however, upon reaching the hill the driver decides to continue on the high gearing he may do so by failing to operate the foot pedal, as the mere fact that he has selected the low gear by actuating the quadrant lever does not effect the operation of the transmission mechanism unless the pedal itself be actuated. Thus it will be seen that a desired set of gearing may be selected prior to changing to the same and while running upon another set of gearing and without affecting the latter.

It will be apparent from the foregoing description that I have provided a simple and efficient controlling mechanism of the progressive type adapted and arranged to operate a transmission mechanism of the selective gear type without the aid of the ordinary change gear lever and H gate, the operating mechanism consisting wholly of the clutch pedal and the quadrant lever which latter, is so positioned that it may be operated without removing the hands from the steering wheel.

It will further be seen that the quadrant lever 112 may be moved to any position at any time without changing any gears in the transmission mechanism until the clutch 14 is released and then thrown in again.

It will also be seen that the clutch is always released before any of the transmission gears are shifted and that the gears are always in position before the clutch is again thrown in.

It will of course be understood that minor changes in the details of construction may be made if desired, without in the slightest degree departing from the spirit of my invention, which, broadly speaking, consists of a control mechanism for a selective gear transmission mechanism operated and governed by a single lever and the clutch pedal.

What I claim is:

1. The combination with a shaft and variable speed transmission mechanism therefor, including a plurality of sets of power transmission elements of selector mechanism for selecting each of the sets of transmission elements to be placed in driving relation with the shaft, and means for placing any selected set of transmission elements in driving relation with the shaft, said means being also operable to return said selected set of transmission elements to neutral position while the selector mechanism is in selective position for any other of the sets of transmission elements.

2. The combination with a shaft, a clutch therefor, and a pedal for operating the clutch, of transmission mechanism including sets of power transmission elements, selector mechanism for selecting each of the sets of elements to be placed in driving relation with the shaft, and means operable from the pedal for placing any selected set of transmission elements in driving engagement with the shaft, said means being also operable to return said selected set of transmission elements to neutral position while the selector mechanism is in selective position for any other of the sets of transmission elements.

3. In a controlling mechanism for transmission gearing the combination with reciprocally mounted power transmission elements, of pivotally mounted cross bars, connecting means between said cross bars and transmission elements, push rods each connected at one end to one end of one of said cross bars, means for lowering any of said push bars at selected times and means for reciprocating said lowered push bar.

4. In a controlling mechanism for transmission gearing, the combination with reciprocally mounted power transmission elements, of movably mounted bars, means operable by the movement of said bars for reciprocating said transmission elements, push rods each movably connected at one end to one end of one of said bars, a cross head reciprocally mounted below said push bars, means for supporting the free ends of said push rods and adapted to be operated to lower a selected one of said push rods upon the cross head, each rod having means for engaging the cross head when such rod is lowered, and means for reciprocating the cross head to actuate the engaging rod.

5. In a controlling mechanism for transmission gearing, the combination with reciprocally mounted power transmission elements, of cross bars pivotally mounted intermediate their length for swinging movement, means operable by swinging of said cross bars for reciprocating said transmission elements, push rods each pivoted at one end to one end of one of said cross bars, each cross bar having a shoulder formed at the under side thereof, projections extending laterally from each push rod, a transversely extending shaft for supporting the free ends of said push rods, said shaft having notches into which certain of the push rods fall when the shaft is in certain position, means for rotating the shaft through predetermined angles, a cross head positioned beneath the push rods in position to be engaged by the shoulder of a rod when the latter is lowered and the cross head moved in one direction, said cross head engaging the projection of said lowered rod when moved in the opposite direction, and means for reciprocating the cross head.

6. In a device of the class described, a gear shifting device comprising a movably mounted finder and pivotally mounted members supported and controlled thereby.

7. In a device of the class described, a gear shifting device comprising a movably mounted finder, pivotally mounted members supported and controlled thereby, and an actuating lever cooperating with said members.

8. In a gear shifting device, a movably mounted finder pivotally-mounted members normally supported thereby, means for operating said members, said finder having a notch, and an indicator operatively connected with said finder for setting the same.

9. In a gear shifting device, a movably-mounted finder, pivotally-mounted members normally supported thereby, said finder having a notch, an indicator operatively connected with said finder for setting the latter, and an actuating lever cooperating with said pivotally-mounted members.

10. In a device of the class described, a variable speed transmission gearing having a plurality of shiftable elements, means for shifting said elements embodying pivoted members movable with said elements, and a predeterminedly selective finder cooperating with and supporting said pivoted members.

11. In a device of the class described, a variable speed transmission gearing having a plurality of shiftable elements, means for shifting said elements embodying pivoted members movable with said elements, a selective finder cooperating with and supporting said pivoted members, and an indicator for cooperation with said finder.

12. In a device of the class described, a variable speed transmission gearing having a plurality of shiftable elements, means for shifting said elements embodying pivoted members movable with said elements, a selective finder cooperating with said pivoted members, and an indicator for cooperation with said finder, said finder having a notch into which the selected member falls by gravity.

13. In a device of the class described, a variable speed transmission gearing having a plurality of shiftable elements combined with a foot pedal, and connections embodying an actuating lever, and a plurality of pivoted vertically-movable members cooperating with said lever.

14. In a device of the class described, a variable speed transmission gearing having a plurality of shiftable elements combined with a foot pedal, and connections embodying an actuating lever, a plurality of pivoted members cooperating with said lever, and a movably mounted finder for supporting and cooperation with said members.

15. In a device of the class described, a variable speed transmission gearing having shiftable elements, in combination with an indicator and a selective device embodying normally elevated pivoted members cooperating with the shiftable elements.

16. In a device of the class described, a gear actuating element, its corresponding actuating member, a finder, an indicator, and movably-mounted members supported and controlled by said finder.

In testimony whereof I affix my signature in presence of two witnesses.

IRVEN E. COFFEY.

Witnesses:
  M. ROEHLER,
  CHAS. L. OLDFIELD.